Dec. 22, 1964  O. E. RAAB ETAL  3,162,220
SAW MEASURING GUIDE

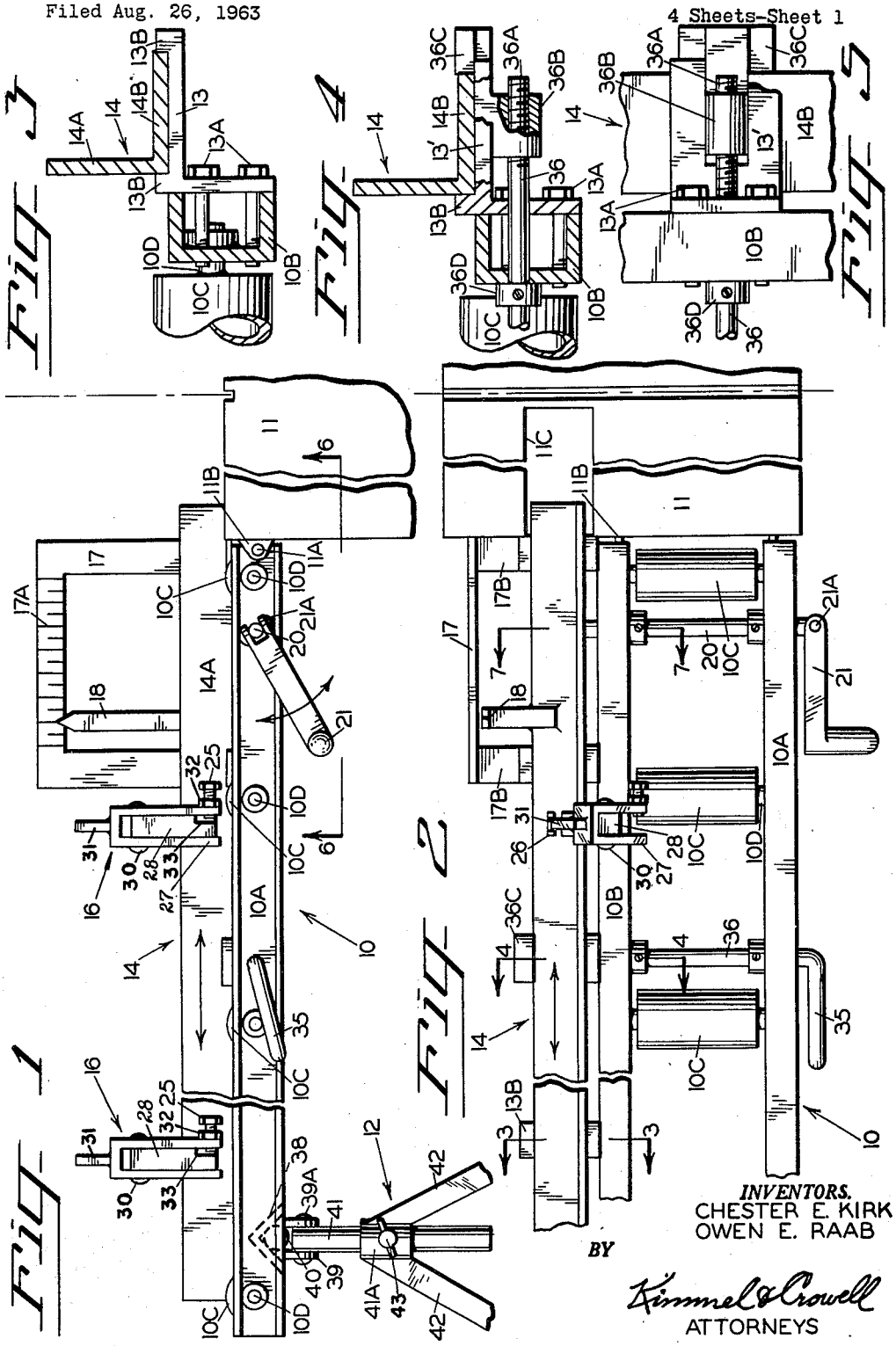

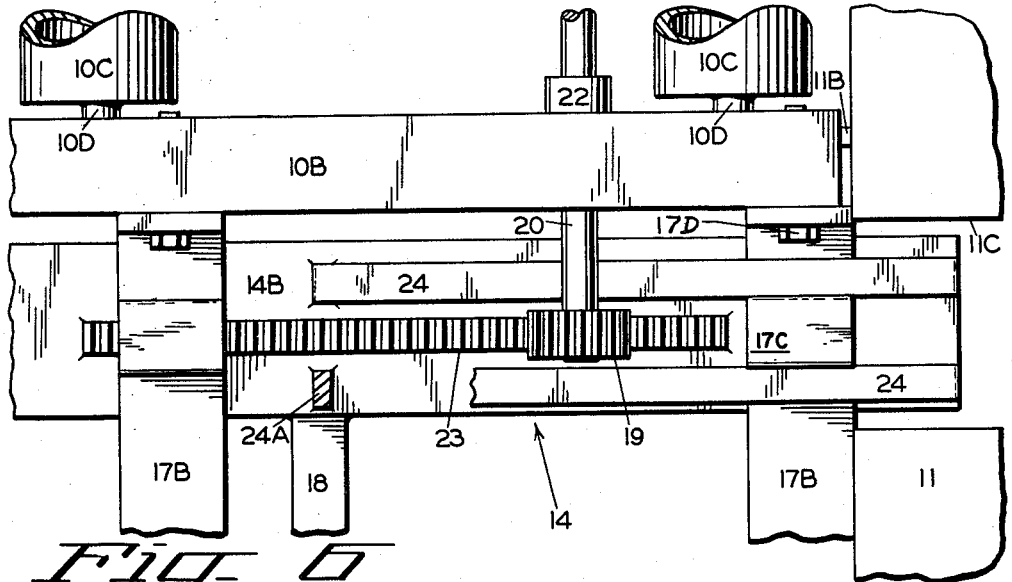
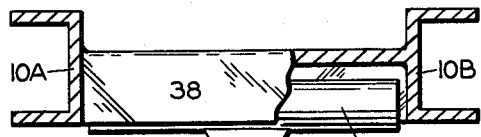
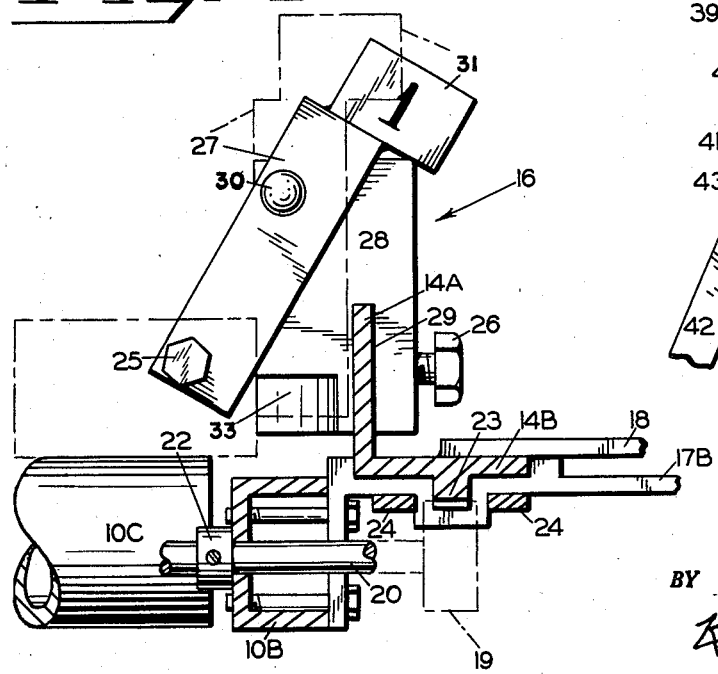

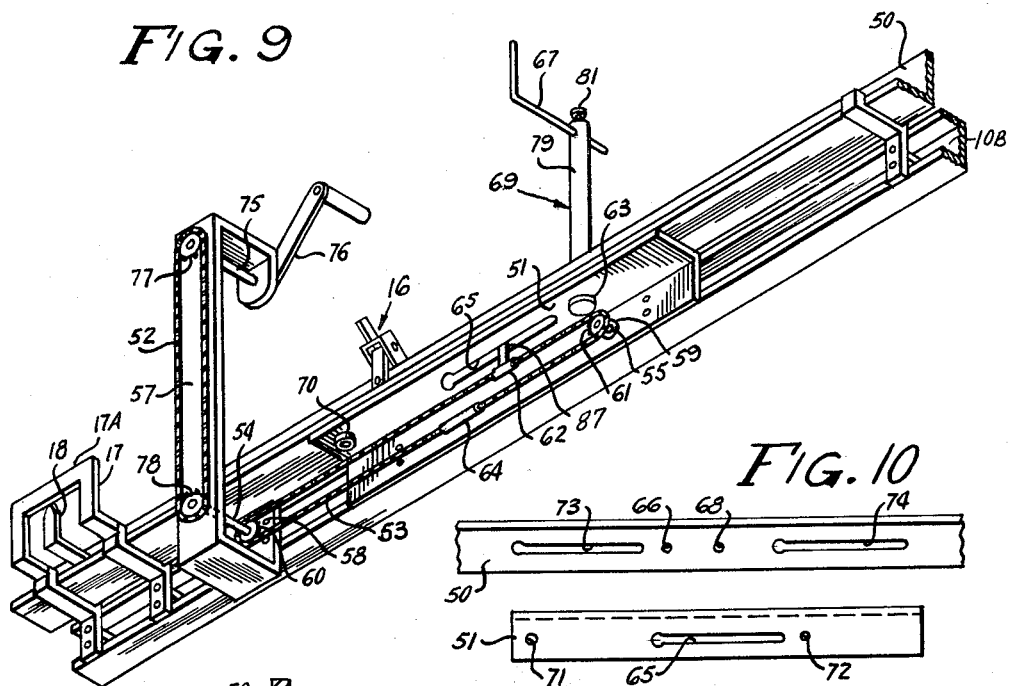
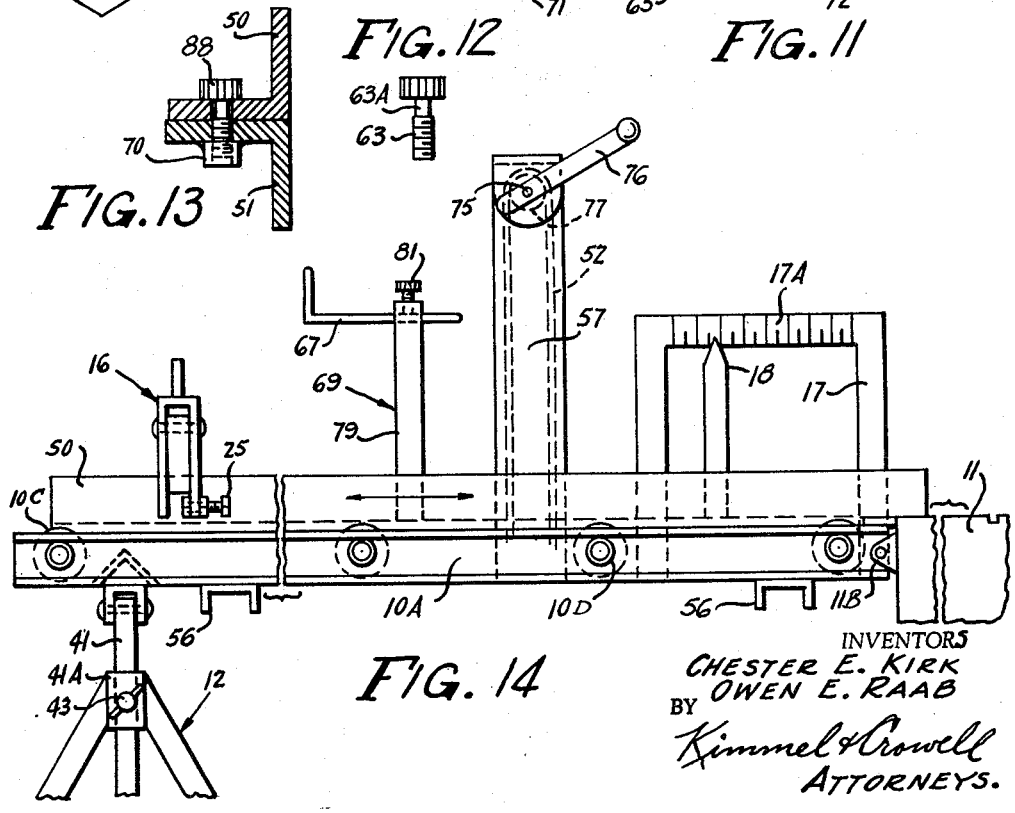

Filed Aug. 26, 1963  4 Sheets-Sheet 4

INVENTORS.
CHESTER E. KIRK
OWEN E. RAAB
BY Kimmel & Crowell
ATTORNEYS.

3,162,220
SAW MEASURING GUIDE
Owen E. Raab, P.O. Box 389, and Chester E. Kirk, 704 N. 17th St., both of Corvallis, Oreg.
Filed Aug. 26, 1963, Ser. No. 304,451
3 Claims. (Cl. 143—174)

This invention relates to a saw measuring guide, and is particularly applicable to cut-off saws or similar devices where it is necessary or desirable to measure rigid material, such as lumber stock and the like, exactly and quickly, when repeated lengths are cut to a predetermined length, and comprises a continuation-in-part of my application Serial No. 42,423, filed July 12, 1960, of the same title.

A primary object of the invention is the provision of a saw meauring guide which is adapted to be attached to and along the side of a conventional framework of a roller conveyor or shop platform used for supporting rigid material while it is being cut by the saw, having one end attached to the saw table, which saw measuring guide may be readily adapted for measuring the lengths of rigid material, and which is provided with both a coarse and a fine adjustment means for accurate measuring.

A further object of the invention is the provision of a saw measuring guide of this character including a carriage provided with stop members at suitable intervals, as for example, one foot, along the supporting framework of the roller conveyor to allow coarse measurements in units of one foot, or its equivalent metric unit, and in which there is additionally provided a vernier screw device for selectively measuring the rigid material in inches, centimeters or division thereof.

An additional object of the invention is the provision of a fine adjustment of this character in which a chain and sprocket means is untilized for moving the carriage of the saw measuring guide toward and away from the saw.

Another object of the invention is the provision of a fine adjustment in which a rack and pinion gear is utilized for moving the carriage of the saw measuring guide toward and away from the saw.

A further object of the invention is the provision of means for locking the carriage of the saw measuring guide in any desired position of adjustment so that saw cuts can be made as desired.

A still further object of the invention is the provision of a device of this character whereby a large number of pieces of rigid material may be individually cut without the necessity for repeated settings of the carriage for each operation.

Another object of the invention is the provision of a device of the above character which reduces the chance of errors associated with the individual measuring of each piece since, while cutting each individual piece of rigid material, the latter is measured accurately and positively and prohibits any chance of error, such as might be occasioned by the misreading of a rule, or the slippage thereof.

Still further objects reside in the combination of elements, arrangements of parts, and features of construction, all as will be more fully pointed out hereinafter and shown in the accompanying drawings.

In the drawings:

FIGURE 1 is a side elevational view of the saw measuring guide of one embodiment of the invention, certain portions thereof being broken away;

FIGURE 2 is a top plan view of the structure of FIG. 1, with certain portions thereof being broken away;

FIGURE 3 is an enlarged sectional view taken substantially along the line 3—3 of FIG. 2 as viewed in the direction indicated by the arrows;

FIGURE 4 is an enlarged sectional view taken substantially along the line 4—4 of FIG. 2 as viewed in the direction indicated by the arrows;

FIGURE 5 is a bottom detail plan view of the structure of FIG. 4;

FIGURE 6 is an enlarged fragmentary detail sectional view taken substantially along the line 6—6 of FIG. 1, as viewed in the direction indicated by the arrows;

FIGURE 7 is an enlarged fragmentary sectional view taken substantially along the line 7—7 of FIG. 2, as viewed in the direction indicated by the arrows, the pivoted weight member being shown in dotted lines in nonoperative position;

FIGURE 8 is an end elevational view of the roller conveyor as shown in FIG. 1, as viewed from the left, certain parts thereof being shown in section;

FIGURE 9 is a perspective view of another embodiment of the invention showing a partial assembly to illustrate the braking means cooperating with the sprocket and chain drive means of the carriage means of the saw measuring guide;

FIGURE 10 is a plan view of the top rail of the movable carriage;

FIGURE 11 is a plan view of the bottom support rail before assembly;

FIGURE 12 is a detailed view of the threaded bolt means used in the second embodiment of the invention as a slide bolt guide means and carriage locking means;

FIGURE 13 is a sectional view of the top carriage rail means and bottom support rail means for the carriage means, being held together by the slide bolt means as illustrated in FIG. 12 with the addition of a securing self locking nut;

FIGURE 14 is a partial front elevation view of the second embodiment of the invention with the conventional saw means removed;

Similar reference characters refer to similar parts throughout the several views of the drawings.

Figure 15:
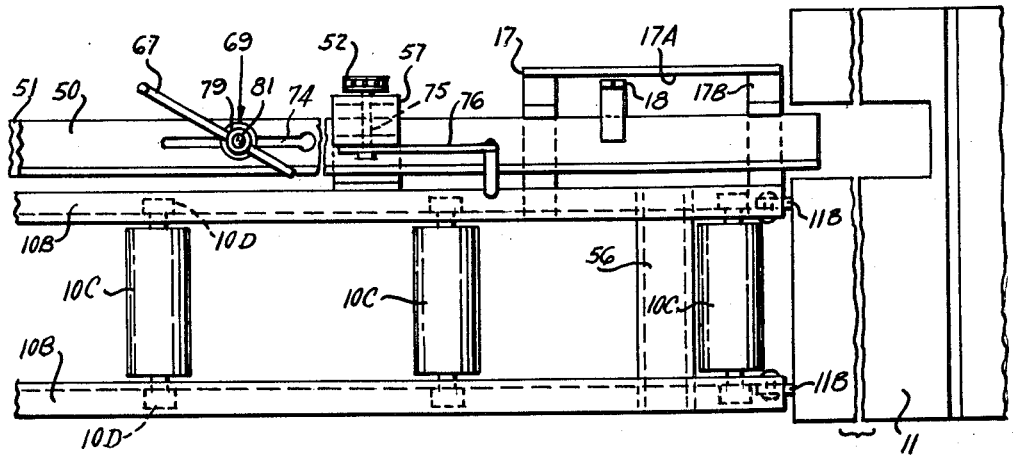
FIGURE 15 is likewise a partial plan view of FIGURE 14.

Having reference now to the drawings in general, and more particularly to FIGS. 1–8, there is generally indicated at 10 the framework of a conventional roller conveyor, which comprises a pair of oppositely disposed channel member 10A and 10B, across which are mounted at suitable spaced intervals rollers 10C carried by axles 10D suitably supported in channels 10A and 10B. Conveyor means 10 may be replaced by a conventional shop support table, if desired.

The ends of channel members 10A and 10B are suitably secured to the saw table 11 by means of pivot pins 11A carried by lugs or ears 11B projecting outwardly from the table, as best shown in FIG. 1.

Extending outwardly from one side of the framework of the roller conveyor 10 there are a plurality of brackets 13, each of which is of substantially L-shaped configuration, as best shown in FIGS. 3 and 4. These brackets are suitably secured, as by means of bolts 13A, which extend through suitable holes through the vertical sides of bracket 13 and channel member 10B shown in FIG. 3. Each of the brackets 13 has along one of the opposite sides of its horizontal arm parallel flanges 13B—13B which serve as a guide-way for an elongated L-shaped movable carriage 14.

The carriage 14 is linearly movable in the guide-way through the brackets 13 in a manner and for a purpose to be more fully described hereinafter, and the saw table 11 is cut away as at 11C to provide a slot into which the inner end of the carriage may extend.

Suitable stop members, each generally indicated at 16, are positioned in set relationship along the vertical flange 14a of the carriage 14, and take the form of support members 28, which are formed with slots 29 for receiving the vertically positioned flange 14A of this carriage and are secured thereto by means of clamping screws 26. A suitable abutment or weight member 27 of this carriage is pivotally mounted on the upper end portion of each of the support members 28 and is connected thereto by a pivot 30, and is adapted to swing outwardly as best shown in FIG. 7.

An indicia plate and counter weight 31 carrying a suitable numbered designation is secured to the upper end of each weight member 27 for indicating the appropriate length in footage from the saw. Positioning screws 25 are mounted in the weight members 27, and are provided with locking nuts 32. The end of each screw is received in a suitable recess 33 in one side of each member 28, when the weight member 27 is in nonoperating position, as shown in dotted lines in FIG. 7.

It will thus be apparent that, when it is desired to saw off a piece of rigid material such as lumber or the like, of a given length, the selected weight member 27 is swung in an outwardly position and will be held therein by counter weight 31 about the pivot 30. By adjustment of the positioning screw 25, the exact appropriate distance, such as one foot or ten centimeters, from the saw blade is pre-adjusted. When it is desired to cut off a longer piece of rigid material, say a foot longer, the weight member 27 may be swung back to its vertical or nonoperative position, as shown in dotted lines in FIG. 7, and the next adjacent weight member along the carriage 14 swung outwardly. The weight members 27 are self biasing to an outwardly rigid position by their own weight. When sawing off a piece of rigid material of a length greater than the distance from the saw to the first stop member 16, the adjacent one sides of members 28 of the stop members ahead of the stop member being used form a lateral guide for this piece of rigid material being sawed, as also shown in dotted lines in FIG. 7.

Vernier adjustment means is provided for adjusting the length of the piece of rigid material to be cut in inches, and this means takes the form of a graduated scale member 17 provided with indicia 17A, preferably marked off in inches and fractions of an inch or the like, and having horizontal arms 17B—17B secured to the channel member 10B by means of screws 17D. A pointer 18 is fixedly secured on the horizontal flange 14B of the carriage. On the under side of the horizontal flange 14B of the carriage there is a suitable rack 23. This rack is engaged by a pinion 19 which is mounted on a shaft 20 journalled in the channel members 10A and 10B and held against axial movement by collars 22. This shaft has at its outer end a crank handle 21, which is pivotally mounted on the end of the shaft by a pivot 21A. Obviously, rotation of the crank 21 will effect minute adjustment of the position of the carriage 14, which adjustment will be indicated by the relative position of the pointer 18 with respect to the scale 17A.

Means are also provided for locking the carriage 14 against longitudinal movement, and in this embodiment of the invention, this means takes the form of an operating handle 35 secured to a shaft 36, the end of which is screw threaded as at 36A and engages in a boss 36B on the underside of a clamping lug 36C, which lug is replaced for one of the lugs 13B in a selected one 13' of the brackets 13. A collar 36D holds the shaft in position adjacent channel 10A. Obviously, partial rotation of the operative engagement with the handle 35 will occasion rotation of the screw threaded end 36A in the boss 36B to move the lug 36C into clamping engagement with the horizontal flange 14B.

As best shown in FIG. 6, means is provided for limiting the travel of the carriage 14 relative to the conveyor frame 10, and this means takes the form of straps 24—24 which are suitably secured to the underside of the horizontal flange 14B, in offset relationship, as by vertical lugs 24A. These straps terminate beyond the inner end of the carriage 14, and extend along the opposite sides of a rectangular boss 17C on legs 17B, adjacent the end of the roller conveyor 10 near to the saw table 11.

The end of the roller conveyor 10 disposed away from the saw table 11 is supported on a tripod member which is generally indicated at 12, and which includes a vertically positioned rod 41 to which diverging legs 42 are secured by means of a collar 41A, the legs 42 being spaced in angular relationship around the collar 41. A set screw 43 secures the collar 41A in position.

The upper end of rod 41 is pivotally connected, as by means of a pivot 39A, between ears 39—39 which are secured on a roller 40. This roller 40 is mounted between the diverging legs of an angle iron 38 which extends transversely between the channel members 10A and 10B, the arrangement being such that the ears 39 may thus swing in a direction parallel to the roller conveyor, while the rod 41 may swing in a direction perpendicular thereto, thus permitting substantially universal adjustment of the tripod to compensate for uneven ground, or other supporting surface, upon which the roller conveyor is positioned, to maintain the rack on an even plane.

From the foregoing the use and operation of the embodiment of FIGS. 1–8 should now be readily apparent. When it is desired to measure a work piece of rigid material, the selected weight member 27 is swung outwardly into the path of the piece of rigid material, so that the head of the positioning screw 25 carried thereby is in the path of the piece of rigid material. Adjustment is then made by means of the crank handle 21 to the exact requisite number of inches, and the operating handle 35 is then partially rotated to lock the carriage 14 in the selected position. After the adjustment is once made, any desired number of similar pieces of identical length may be sawed without further adjustment of the carriage.

When readjustment is desired, release of the operating handle 35 permits a further movement of the carriage 14, within the limit of a foot to a requisite number of inches, the several stops 16 being so arranged along the carriage as to measure the length in units of a foot.

Another embodiment of the invention is shown in FIGURES 9–19 in which a chain means and sprocket means is used to make measuring adjustments between carriage means 50 and a cutoff saw or the like. Likewise, this embodiment of the invention employs a handle actuated locking means between carriage means 50 and stationary bottom rail structure 51 which fixedly clamps members 50 and 51 together when carriage means 50 is properly adjusted for a desired length of rigid material to be cut. The guide means between carriage means 50 and stationary rail support structure consists of slot and guide bolt means as shown in FIGURE 13. The bolt means 63 of FIG. 12 is employed in the locking means.

The chain adjustment means of this embodiment for carriage means 50 consists generally of sprocket chains 52 and 53. Sprocket chain 53 is supported on shaft means 54 and 55 by sprocket means 60 and 61, respectively. Shaft means 54 is journalled in structural member 57 secured by plural bolt means 58 to channel member 10B. Shaft means 55 is supported in any suitable bearing means 59 of rail support structure 51. Sprocket chain 53 is secured to carriage means 50 by a bolt means 87 similar to the bolt means 63 of FIGURE 12 having a suitable lug nut means 62 for fixed attachment to sprocket chain means 53. Chain means 53 has a conventional adjustment or take-up means 64 for proper operation. The bolt means 87 for chain 53 is secured to carriage means 50 by aperture 66 shown in FIGURE 10, and also slides in slot means 65 of bottom rail structure 51 as shown in FIGURE 11.

The guide means between carriage means 50 and stationary bottom or rail support structure 51, more specifically, consists of a bolt means 88 similar to bolt means 63 of FIGURE 12, in association with a self locking nut means 70. This nut and bolt means is secured in aperture 71 of stationary rail structure 51 of FIGURE 11, and slide in slot 73 of carriage means 50 of FIGURE 10.

Sprocket chain 52 is supported on sprocket means 77 and 78 carried by shafts 75 and 54, respectively. Shaft 75 is journalled in conventional bearings in the top portion of vertical structural member 57 and is fixedly attached to manual crank means 76 or other desired means.

The locking means of this embodiment of the invention, more specifically, consists of handle means 67 secured in opening 80 of body means 79 by screw means 81 and threaded aperture 81A. Body means 79 of the locking means is connected to carriage means 50 and lower support structure 51 by the bolt means 63 in slot means 74 and aperture 72, respectively, as shown in FIGURES 9, 10, 11 and 15.

To make an adjustment in this embodiment of the invention, locking means 69 is released by manually turning crank means 67 counterclockwise when looking in plan. Then crank 76 is turned as desired to rotate chain 52 through sprocket means 77 carried by shaft means 75 turning sprocket 78 which turns chain 53 by sprocket means 60 through shaft 54 in a desired direction which transmits movement to carriage means 50 through lug nut 62 and bolt means 87.

In FIGURES 10 and 11 slot means 65, 73, and 74 each have at one end an enlarged opening to receive the enlarged portion of bolt means 63, 87, and 88. Referring to FIGURE 12 the bolt means 63 has a milled and flat sided neck portion 63A. Each of the bolt means 63, 87 and 88 have similar flat sided neck portions which are used to slide in slots 73, 74, and 65 of carriage member 50 and stationary rail structure 51, respectively, both as a carriage guide means and as a locking means between carriage means 50 and stationary rail support structure 51.

Certain reference numerals of the embodiment of FIGURES 1–8 represent like parts in FIGURES 9–19, namely, conveyor channel member 10A, rollers 10C, axles 10D, saw table 11, lugs 11B, supporting tripod 12 consisting of members 41, 41A, and 43, stop members 16, scale means 17 carrying indicia 17A, and pointer 18. For the sake of clarity other parts already named and described with reference to FIGURES 1–8 which are also applicable in common to FIGURES 9–19 are purposely omitted as being understood by those skilled in the art. Furthermore, the conventional saw means is removed for the sake of clarity.

FIGURE 14 discloses the new locking means 69 for carriage means 50 consisting of body member 79, crank means 67 and screw means 81, as shown. The structural member 57 and manual crank means 76 are also shown, all the above being more fully illustrated and described with reference to FIGURES 9 and 15. Also support brackets 56 have been added for additional support for the conveyor means of FIG. 14.

FIGURE 15 is a partial plan view of FIGURE 14 in which graduated scale 17 is secured to channel member 10B, horizontal portions 17B of scale means 17 are shown with pointer means 18 attached to carriage means 50 as in FIGURE 2. FIGURE 15 also illustrates in plan new locking means 69 consisting partially of handle means 67, body means 79 and screw means 81. Crank means 76 and structural means 57 of the new chain drive means for carriage means 50 is also shown in plan.

Figures 16, 17, 18, 19:
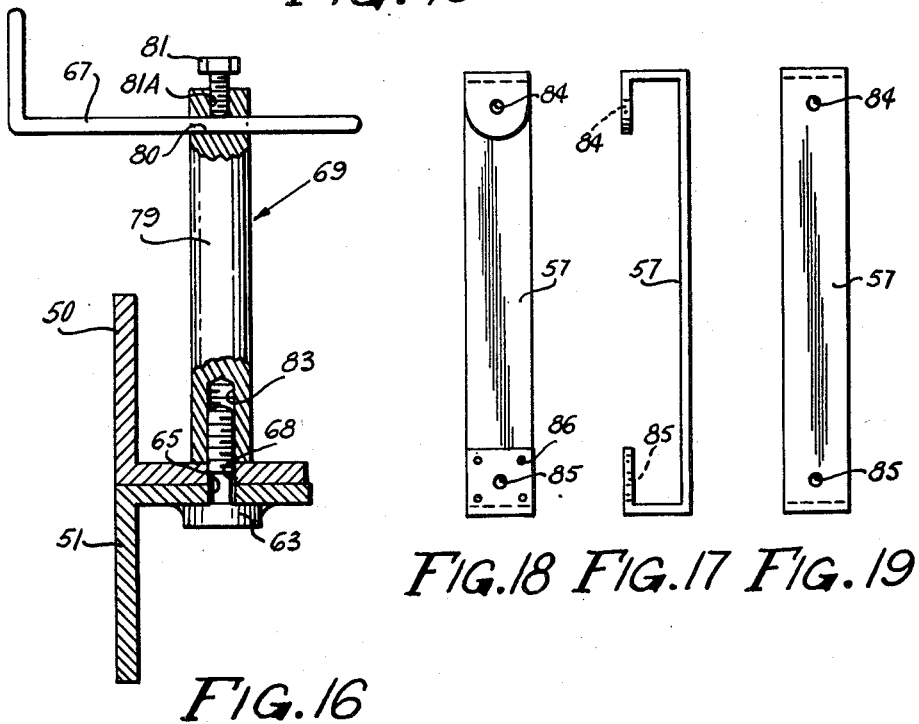
FIGURE 16 is a partial sectional view through the movable top rail carriage means and the stationary bottom rail showing a modified assembly of the locking means of this embodiment of the invention.
FIGURE 17 is a side elevation view of the structural support means for the driving chain and sprocket means of the carriage means for the second embodiment of the invention.
FIGURE 18 is a plan view of FIG. 17.
FIGURE 19 is a bottom or back view of FIG. 17.

FIGURE 16 discloses in partial cross-section a modified manner of assembly of carriage member 50 and stationary support member 51 with respect to locking means 69 consisting of bolt means 63 carried in slot 65 of bottom structural support member 51 and aperture 68 of carriage means 50. Bolt means 63 is connected to body member 79 by threaded aperture 83 as shown. Crank means 67 is secured in aperture 80 of body member 79 by threaded screw 81 in threaded aperture 81A. Of course, slot means 65 in this embodiment would have to be sufficient in length to accommodate both bolt means 63 of locking means 69 and bolt means 87 secured to sprocket chain 53 in order to avoid contact between the same in operation.

FIGURES 17–19 disclose the structural support means 57 for chain 52 and sprockets 77 and 78. Journal means 84 carries shaft means 75 and journal means 85 carries shaft means 54. The four bolt holes 86 are for securing structural member 57 by bolt means 58 to channel member 10B as shown in FIGURE 9.

To operate the embodiment of the invention as shown in FIGURES 9 through 19, for a desired length of rigid material to be cut, locking means 69 is loosened by turning handle 67 counterclockwise as seen in plan. Then crank means 76 is appropriately turned in a direction to position pointer means 18 fixed to carriage means 50 to a desired unit of indicia on fractional food scale 17a, after which locking means 69 is locked by turning crank means 67 clockwise. The carriage overhang lever means of a selected stop means 16 with a designated lever stop means having a desired foot measurement indicia on it, is in position over the carriage means 50 contiguous to conveyor means 10 and a refined measurement adjustment in final is made by appropriately turning screw means 25 of stop means 16. The saw measuring guide is then in proper adjustment for cutting pieces of rigid material to a desired selected length.

From the foregoing it will now be seen that there is herein provided an improved saw measuring guide which accomplishes all the objects of this invention, and others, including many advantages of great practical utility and commercial importance.

As many embodiments may be made of this inventive concept, and as many modifications may be made of the embodiments hereinbefore shown and described, it is to be understood that all matter herein is to be interpreted merely as illustrative, and not in a limiting sense.

We claim:

1. For use with a saw table and conveyor arranged in tandem relation, said conveyor including a horizontally disposed longitudinally extending frame element, a measuring guide comprising a bracket of L-shaped configuration, said bracket having one flange vertical and adapted to be secured to said frame element exteriorly of said conveyor, said bracket having the other flange thereof horizontal and above said one flange, an upwardly facing guideway on said other flange, a carriage mounted in said guideway for sliding longitudinal movement therealong, said carriage including an upright flange arranged in parallel relation with respect to said guideway, a vertically disposed support member slideably mounted on said upright flange for longitudinal back and forth movement therealong, a vertically disposed abutment member positioned adjacent said support member and having the portion adjacent the upper end thereof pivotally connected to said support member for swinging movement from the vertical position to a position in which the portion of said abutment member adjacent the lower end projects over said conveyor into the path of movement of a work piece on said conveyor when said bracket one flange is secured to said conveyor frame element, a weight carried by the upper end of said abutment member and operable by the force of gravity to hold said abutment member in the projected position when manually moved from the vertical position, means for effecting the longitudinal movement of said carriage along said guideway, and means for locking said carriage in a selected position with respect to said guideway.

2. For use with a saw table and conveyor arranged in tandem relation, said conveyor including a horizontally disposed longitudinally extending frame element, a measuring guide comprising a bracket of L-shaped configuration, said bracket having one flange vertical and adapted to be secured to said frame element exteriorly of said conveyor, said bracket having the other flange thereof horizontal and above said one flange, an upwardly facing guideway on said other flange, a carriage mounted in said guideway for sliding longitudinal movement therealong, said carriage including an upright flange arranged in parallel relation with respect to said guideway, a vertically disposed support member provided with a vertically arranged slot extending upwardly from the lower end thereof, said support member being positioned with said slot receiving the portion of said upright flange adjacent the upper end thereof, said support member being slideable along said upright flange, a vertically disposed abutment member positioned adjacent said support member and having the portion adjacent the upper end thereof pivotally connected to said support member for swinging movement from the vertical position to a position in which the portion of said abutment member adjacent the lower end projects over said conveyor into the path of movement of a work piece on said conveyor when said bracket one flange is secured to said conveyor frame element, a weight carried by the upper end of said abutment member and operable by the force of gravity to hold said abutment member in the projected position when manually moved from the vertical position, means for effecting the longitudinal movement of said carriage along said guideway, and means for locking said carriage in a selected position with respect to said guideway.

3. For use with a saw table and conveyor arranged in tandem relation, said conveyor including a horizontally disposed longitudinally extending frame element, a measuring guide comprising a bracket of L-shaped configuration, said bracket having one flange vertical and adapted to be secured to said frame element exteriorly of said conveyor, said bracket having the other flange thereof horizontal and above said one flange, an upwardly facing guideway on said other flange, a carriage mounted in said guideway for sliding longitudinal movement therealong, said carriage including an upright flange arranged in parallel relation with respect to said guideway, a vertically disposed support member provided with a vertically arranged slot extending upwardly from the lower end thereof, said support member being positioned with said slot receiving the portion of said upright flange adjacent the upper end thereof, said support member being slideable along said upright flange, a vertically disposed abutment member positioned adjacent said support member and having the portion adjacent the upper end thereof pivotally connected to said support member for swinging movement from the vertical position to a position in which the portion of said abutment member adjacent the lower end projects over said conveyor into the path of movement of a work piece on said conveyor when said bracket one flange is secured to said conveyor frame element, a weight carried by the upper end of said abutment member and operable by the force of gravity to hold said abutment member in the projected position when manually moved from the vertical position, means for effecting the longitudinal movement of said carriage along said guideway, means for locking said carriage in a selected position with respect to said guideway, said last-named means embodying a movable clamping lug carried by said bracket other flange and operable when moved in one direction to clampingly engage an edge portion of said carriage and to bias said carriage against one side of said guideway, and manually operable screw means for effecting the movement of said lug.

References Cited by the Examiner
UNITED STATES PATENTS

| | | | |
|---|---|---|---|
| 663,645 | 12/00 | Strait. | |
| 867,081 | 9/07 | Robinson | 143—174 |
| 1,375,159 | 4/21 | Krocker. | |
| 1,658,826 | 2/28 | Yerk et al. | |
| 2,742,935 | 4/56 | Acton | 143—168 |
| 2,787,301 | 4/57 | Anderson. | |
| 2,838,078 | 6/58 | Cusanza | 143—168 |

WILLIAM W. DYER, Jr., *Primary Examiner.*

LEON PEAR, *Examiner.*